(No Model.)

T. P. WISE.
RAT AND MOUSE TRAP.

No. 325,717. Patented Sept. 8, 1885.

WITNESSES

Thomas P. Wise.
INVENTOR

By C. A. Snow & Co.
Attorneys

UNITED STATES PATENT OFFICE.

THOMAS P. WISE, OF RICHMOND, VIRGINIA.

RAT AND MOUSE TRAP.

SPECIFICATION forming part of Letters Patent No. 325,717, dated September 8, 1885.

Application filed December 16, 1884. (No model.)

*To all whom it may concern:*

Be it known that I, THOMAS P. WISE, a citizen of the United States, residing at Richmond, in the county of Henrico and State of Virginia, have invented a new and useful Improvement in Rat and Mouse Traps, of which the following is a specification, reference being had to the accompanying drawings.

My invention relates to a rat and mouse trap; and it has for its object to provide at a slight cost a device of this character which shall be cheap and simple in its construction, effective and positive in its operation, and one that will not be likely to get out of order.

With these ends in view the invention consists in the improved construction and combinations of parts, hereinafter fully described, and pointed out in the claims.

Figure 1:
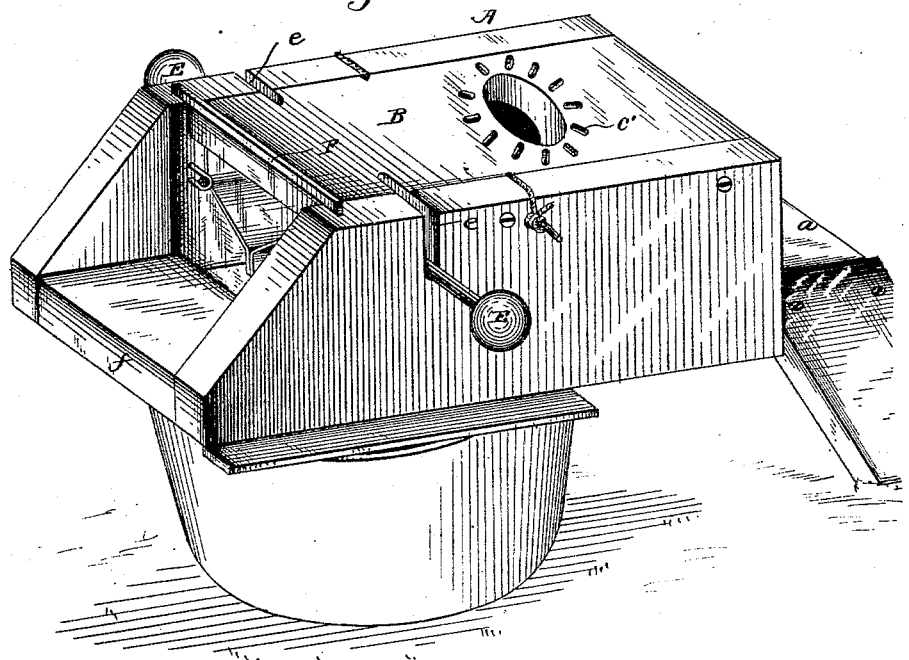
Figure 2:
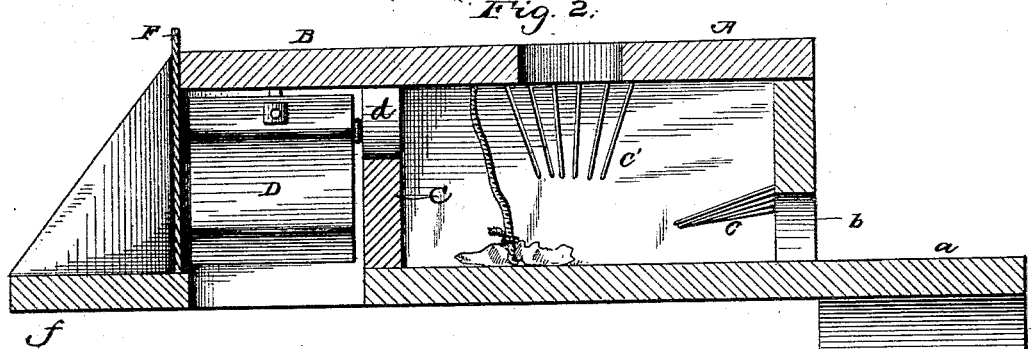
Figure 3:
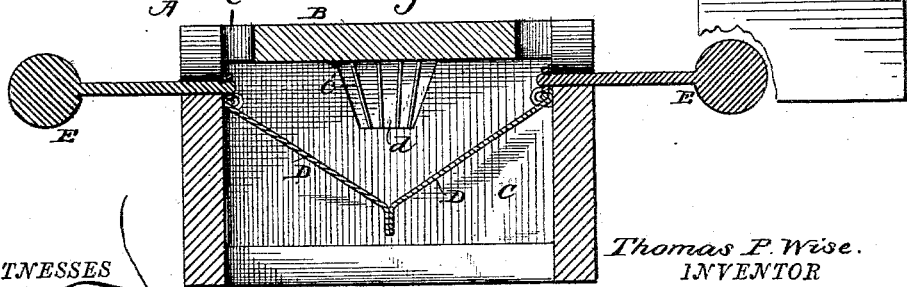

In the drawings, Figure 1 is a perspective view of a rat and mouse trap constructed in accordance with my invention. Fig. 2 is a longitudinal vertical section of the same, and Fig. 3 is a transverse section taken at one end of the box or casing, and showing the manner of arranging and hanging the drops or falls.

In the accompanying drawings, in which like letters of reference indicate corresponding parts in all the figures, A represents a suitable box or casing, which may be constructed of wood or metal. In the present case, however, I have shown it of wood, that being my preferable material. The said box or casing A is formed at one end with an extension, $a$, which may be a part of the bottom of the said casing or made separate therefrom and secured thereto. At the lower end of the end piece, adjacent to the extension, is formed a hole or opening, $b$. Upon the inner side of the end piece are arranged, adjacent to said opening $b$, a series of radial wires or rods, $c$, which incline or converge at their ends, thus forming what might be termed a "passage," the entrance-opening to which is larger than the exit, so that when a rat or mouse enters the box or casing through the said passage it will be impossible for him to escape therefrom by the passage from which he entered.

B represents the top or cover, which is preferably supported in such manner that it will be flush with the upper edges of the sides of the casing. The said top or cover B is provided with an entrance hole or opening, which, like the opening of the end piece of the casing, is surrounded on its inner side by a series of wires or rods, $c'$, which incline or converge, as shown, to prevent the escape of a rat or mouse when once within the box or casing.

C represents a partition strip or wall, which divides the box or casing into two compartments, the one which we will term the "forward compartment" being somewhat the smaller of the two. The said strip or wall C serves as a support for one end of the top or cover, and in said partition strip or wall is made a hole or opening, $d$, to establish communication between the two compartments. The bottom of the box or casing is cut away in the front compartment, and pivoted to the sides of the same in any suitable manner are drops or falls D, the ends of which are turned downwardly and bear against each other. The upper ends of said drops or falls are turned upwardly at right angles to the body portion, or nearly so, and are provided midway between their ends with holes or openings, in which holes or openings are seated the ends of rods or levers E, held in place by nuts, as shown, said arms or levers extending through slots in the sides of the casing, and having weighted ends, in order that the drops will be maintained in a closed position, the said arms or levers being adapted when the drops are lowered to their full extent to enter slots $e$ in the cover. It will be seen that by making said arms or levers detachable from the drops or falls, in packing the traps for transportation considerable space can be saved.

The sides of the box or casing, near the forward end thereof, are provided with grooves, in which slides a pane of glass, F, and the sides of the box or casing are extended beyond the forward end of the box or casing, at which point the pane of glass is located to support said forward end, and in order that the open bottom of the floor of the front compartment may be located a suitable distance from the edge of the tub or bucket containing water, upon which the trap is adapted to be supported.

Fitted and closing the space between the extended sides of the box or casing, at the forward end thereof, is a strip, $f$, which prevents the rats or mice from escaping from the tub or bucket when once precipitated therein.

The operation is as follows: The trap is placed upon a tub or bucket containing water, and the intervening space between the trap and the sides of the said tub or bucket covered by boards or planks. Strips or boards are then placed in position to connect the extension a with the ground. The bait is placed in the rear compartment, and is attached to cords or strings, which pass through notches in the sides of the casing, and are attached at their ends to pins on the sides of the casing, so that the bait cannot be carried away by the rat or mouse. The rat or mouse, in entering the trap, passes through one of the entrance-openings, and, finding escape through the same impossible, immediately makes for the light which is admitted through the pane of glass forming one end of the casing, supposing that escape will lie in that direction. As soon as the rat or mouse has passed through the opening in the partition strip or wall he drops upon the falls, and the same open and he is precipitated into the water and drowned, the drops or falls being returned to their normal position by the weighted levers.

It will be seen from the above description that a trap constructed in accordance with my invention is cheap and simple, that its operation is positive and effective, and that it is not likely to get out of order.

Heretofore it has been proposed to construct a rat-trap with two compartments, in one of which the rat enters and passes through suitable guarded openings into the second compartment, the latter being provided with a wire-gauze covering at the top to light up the second compartment, and thus lure the animal farther into the trap. This construction I do not desire to claim, since it does not attain the object of the present invention, it being necessary to kill the rat in the second compartment, as there is no means provided, as is in my case, for disposing of the victim. Furthermore, in the present case, the transparent pane F will not only serve to light up the trap, but will also lure the rat forward in the following manner: After the rat is caught in the first or large compartment, he cannot escape therefrom through the openings by which he entered, as they are guarded by wire prongs. He will therefore direct his attention to the opening $d$, which appears to him to be a means of escape. By looking through the opening $d$ the rat will see the glass pane, which to him appears as if the trap was open, and under that supposition the rat will leap from the opening $d$ of the partition C, and striking the glass pane will be precipitated down upon the tilting drops, and thence fall into the tub. The glass or transparent pane not only closes the second compartment, lights up the trap, and lures the rat forward, but deceives him in thinking the glass pane is an opening to enable him to escape.

In order to define the nature, scope, and advantages of the present invention, I would have it understood that I lay no claim herein to a rat-trap provided with hinged drops and weighted arms to maintain the drops in the closed position.

Having fully described my invention, what I claim as new, and desire to secure by Letters Patent, is—

1. A trap comprising a box or casing having a partition or wall, C, which divides the casing into two compartments, an opening or passage, $d$, provided in the partition or wall to allow communication between the compartments, one of the latter having openings for the entrance of the victim, which openings are guarded to prevent it from escaping, and the other compartment having an open bottom, which is closed by a drop or drops, and a glass or transparent pane closing the end of this compartment opposite the partition C, as set forth.

2. In a trap, the box or casing divided by a partition or wall, C, into two compartments, the forward compartment having openings for the entrance of the rat and communicating with the rear compartment, the latter having an open bottom, in combination with a drop or drops for closing the bottom, the end of the rear compartment being closed by a transparent pane, F, the hinged drop being located between the partition C and the pane, as set forth.

3. The combination, with a trap having an open bottom, of hinged drops to close said bottom, and weighted arms detachably secured to the drops and working in slots in the box or casing, substantially as set forth.

In testimony that I claim the foregoing as my own I have hereto affixed my signature in presence of witnesses.

THOMAS P. WISE.

Witnesses:
EDW. G. SIGGERS,
THEO. MUNGEN,
G. B. HARRIS.